May 27, 1924. 1,495,406

M. R. DEYO

STOREHOUSE OR CRIB

Original Filed Nov. 15, 1920   2 Sheets-Sheet 1

INVENTOR.

ATTORNEYS.

May 27, 1924.

M. R. DEYO

STOREHOUSE OR CRIB

Original Filed Nov. 15, 1920   2 Sheets-Sheet 2

1,495,406

INVENTOR.
Mark R Deyo
BY
ATTORNEYS.

Patented May 27, 1924.

1,495,406

UNITED STATES PATENT OFFICE.

MARK R. DEYO, OF PEORIA, ILLINOIS.

STOREHOUSE OR CRIB.

Original application filed November 15, 1920, Serial No. 424,021. Divided and this application filed June 28, 1922. Serial No. 571,539.

*To all whom it may concern:*

Be it known that I, MARK R. DEYO, a citizen of the United States, a resident of Peoria, in the county of Peoria and State of Illinois, have invented new and useful Improvements in Storehouses or Cribs, of which the following is a specification.

This invention has reference to the storage of corn, wheat, oats, etc., and it has for its principal object to provide a crib or storehouse built primarily of cement staves in such a manner as will provide the necessary ventilation to keep the corn from sweating and dry it so that it may grade properly. The construction being such that compartments or bins are provided to receive the corn and small grains.

The invention has for a further object to construct a corn and grain crib or storehouse preferably of cement staves and circular in cross-section, with an annular outer compartment or bin for the corn and an inner compartment for the smaller grain. The outer compartment being cut through for a portion of its height to provide for a drive-way extending through the structure, with the inner compartment or bin thereabove which is preferably tapered to a central discharge in the ceiling of the driveway. The outer wall of the structure, as well as the inner wall for the outer compartment, which separates the latter from the drive-way, and the wall for the inner compartment or bin having ventilating means; whereby, drafts of air may have ingress to the outer compartment or bin and may pass up through the corn and out through a discharge at the top of the structure.

The invention has for a further object to construct a crib or store-house for corn and small grains which shall be fire and waterproof, and to this end the structure is preferably built of cement, including staves of the same material laid course on course and so arranged as to provide ventilating openings for the passage of air into the building; such ventilating openings being constructed in a manner as will prevent water entering therethrough, and being provided with guards or gratings so as to prevent the corn falling therethrough and rodents entering the building through such ventilating openings.

The invention has for a further object an improved type of stave for the outer wall of the building and an improved type of stave for the wall of the inner compartment or bin of the building. The staves for the outer wall are constructed so that they interlock and preferably provide ventilating openings arranged in staggered formation around the outer wall of the building, and the staves for the wall of the inner compartment or bin are so constructed as to provide a plurality of vertical air shafts covered by plates having inlet openings into said shafts.

This application is a division of the application filed by me on November 15, 1920, bearing Serial Number 424,021.

That the invention may be more fully understood reference is had to the accompanying drawings forming a part of the present description, illustrating a preferred embodiment of the invention, in which:—

Like characters of reference denote corresponding parts throughout the figures.

Figure 1:
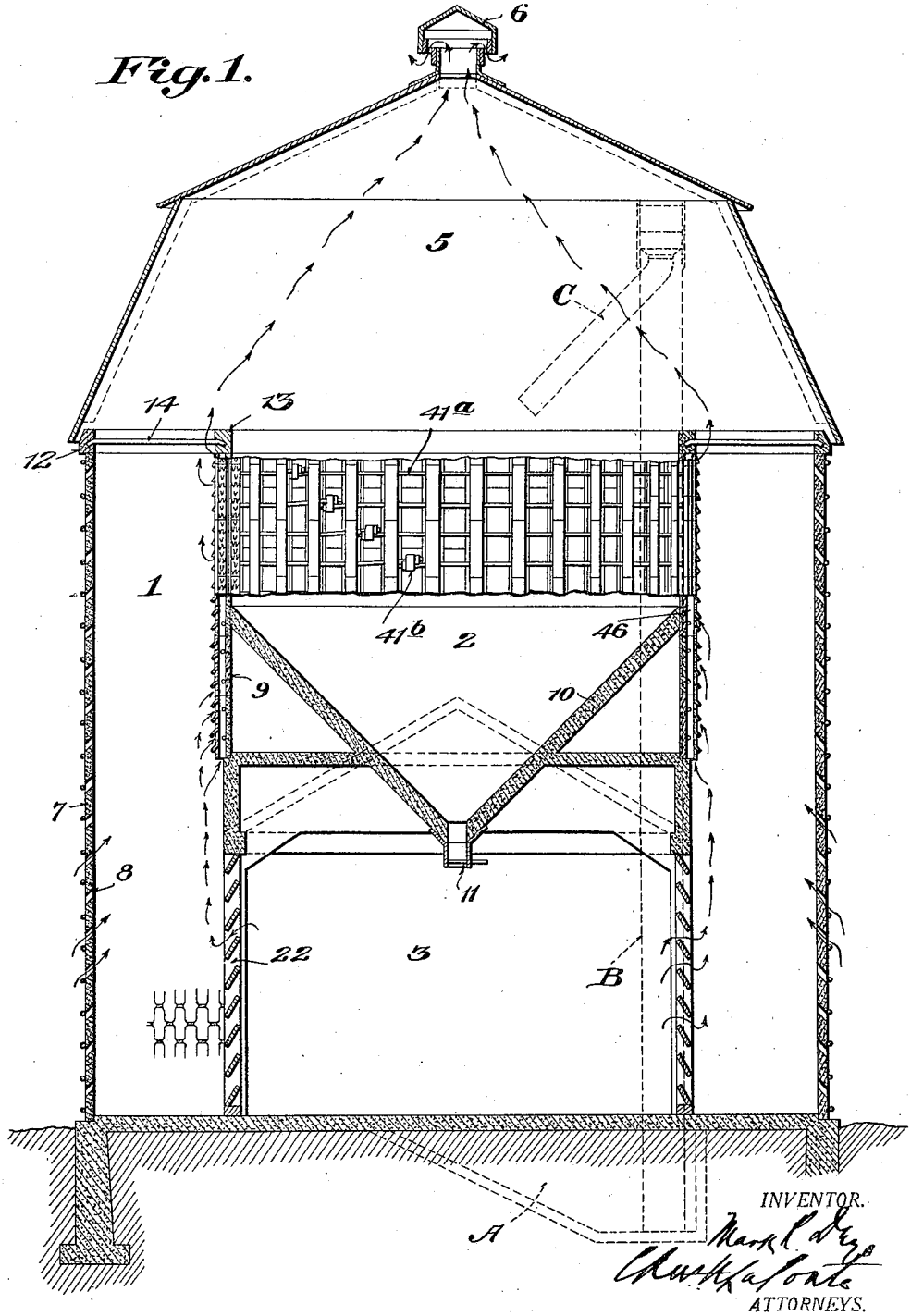
Figure 1 is a vertical sectional view, partly in elevation, through the store-house or crib.

In Figure 1, I have shown a building embodying my invention in one of its preferred forms, and as constituted is of circular formation with an outside compartment or bin 1 in which to store corn, and an inner compartment 2 in which to store small grain. A driveway 3 passes through the lower portion of the building and the building is capped by a turret shaped roof 5 having a covered air discharge outlet 6 in the center of the top of the building. The main building structure, excluding the roof, is constructed preferably of cement, and the roof made of suitable non-inflammable material.

The outer wall of the building comprises a plurality of courses of cement staves 7 built up, one above the other, in a manner as will provide ventilating openings 8 for the ingress of air into the outer compartment or bin 1. The height of this wall may be whatever is desirable or within reason. The compartment or bin 1 is enclosed within the outer wall made up of the staves 7, and an inner wall constructed of the staves 9, built up, one upon the other in the manner shown. The inner wall is circular, like the outer wall and provides the inner compartment or bin 2, having an inverted cone shaped bottom 10 which unites with the inner circular wall to produce said inner compartment or bin 2, and said bottom 10 has a valve controlled outlet 11 controlling the discharge of the grain, which may be discharged therefrom into a wagon or other receiving means located or stationed within the driveway 3. The inner and outer walls at their tops are capped by the cement rings 12 and 13 held together by suitable tie rods 14 located at intervals therearound.

Inasmuch as this application is directed to the inner wall of the crib or store-house and to the staves 9 comprising the same, and inasmuch as the original application, bearing Serial No. 424,021, of which this application is a division, very clearly describes the driveway and supporting structure and clearly describes and claims the specific outer wall structure and staves comprising the same, it is not thought necessary to devote any space to the same in this application, other than has already been given.

Referring to the inner wall of the crib or store-house, a description of the individual staves 9 comprising such a wall will now be given:—

Figure 4:
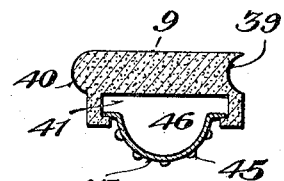
Figure 4 is a cross-section, in plan, as the same would appear if taken on the line 4—4 Figure 2.
Figure 6:
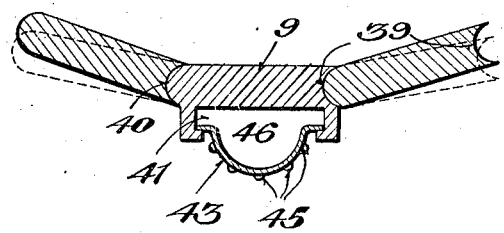
Figure 6 is a top edge view in section showing a plurality of the staves illustrating how the concave and convex edges permit of circular construction of the crib or store-house of different diameters and yet provide a tight joint between the same.

The stave 9 is preferably made of cement having its opposite longitudinal edges concave and convex, as at 39 and 40, see Figure 4, to provide an interfitting joint of the adjoining staves 9, see Figure 6. The bodies are also preferably imperforate and their front faces are formed with channels 41 extending the full length of the stave, the ribs of which have corresponding notches 42 intermediate their ends. In the channeled faces of the staves are held the opposite edges of the preferably bowed plates 43, the bodies of which are provided with a plurality of air inlet openings 44 produced by stamping the sheet so as to provide the inclined lips 45 the formation of which leaves the openings 44. The assembling of the plates 43 in the channeled faces on the staves 9 produces air shafts 46, which when the staves are built up, course upon course, to provide the wall for the compartment or bin 2 provides a plurality of vertically disposed air shafts 46 around said wall and within the compartment or bin 1 for the passage of air entering the compartment or bin 1 through the ventilating openings 8 and 22 and which will find an escape through the openings or perforations 44 in the plates 43 and the air shafts 46. Air of course will find passage up through the corn stored in the compartment or bin 1 and out of the top of the roof of the building. The construction of the ring 13 at the top of the wall for the compartment or bin 2 will not interfere with the passage of the air from the vertical shafts 46 out through the top of the compartment or bin 1.

The wall for the inner compartment or bin 2 may be constructed entirely of staves 9 and plates 43 having the air shafts 46, although it may be found desirable to have only each alternate row of staves 9 with air shafts and to construct the other rows of staves minus said air shafts as shown in Figure 6.

Figure 2:
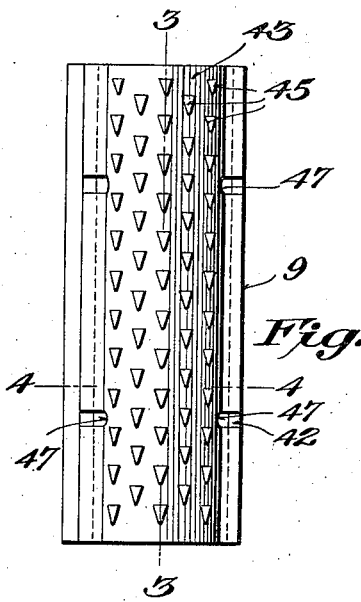
Figure 2 is a front elevation of one of the staves included in the wall for the inner compartment or bin.
Figure 3:
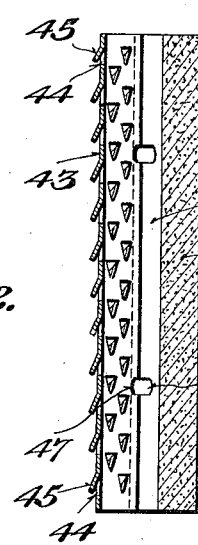
Figure 3 is a vertical sectional view of the stave, as the same would appear, if taken on the line 3—3 Figure 2.

The edges of the plates 43 may have notches 47, see Figure 2 to coincide with the notches 42 in the ribs of the channels 41 on said staves 9 and said coinciding notches receive band rods or hoops 41ª, see Figure 1, which are threaded through said slots and around the wall formed by said staves 9 to bind the wall together and brace it against expansion from pressure within. The rods or hooks being connected by suitable couplings 41ᵇ, see Figure 1.

Figure 5:
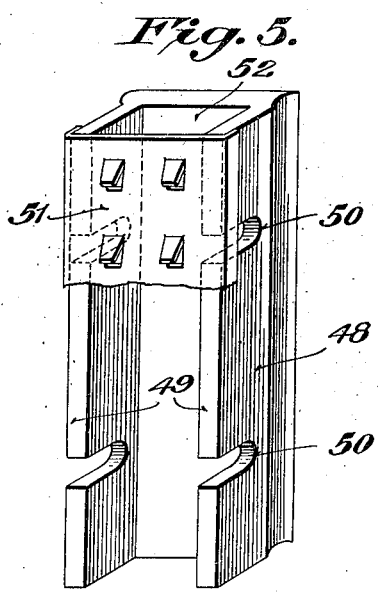
Figure 5 is a perspective view of a modified form of stave.

In Figure 5 a modified form of stave 9 is shown. Here the stave 48 is formed with spaced flanges 49, having slots 50 intermediate its ends to receive the tie rods, not shown, and the cover plate 51, which, together with the flanges 49 produce the air shafts 52, are somewhat similar to the plates 46, except that instead of having the edges of the plates 51 held in channels they are clamped lengthwise of and over the flanges 49 in the manner shown in Figure 5.

I have made no attempt to show in detail how the corn and grain may be elevated into the compartment or bins 1 and 2, as these methods are well known and form no part of the present invention. However, in dotted lines I have shown a chute A to receive the material to be elevated by an elevator B to be discharged at various points and in different directions, by a swivel and extensible spout C.

It is believed that the function of the staves 9 are well understood when used in buildings of the character referred to without further detailed explanation, and that I have no desire to be limited to the precise details, except as specified in the appended claims.

What I claim is:

1. A cement stave for building purposes, comprising a body having a channeled face, and a plate attached to said stave to form an air shaft between said plate and stave, said plate being provided with a plurality of ventilating openings.

2. A cement stave for building purposes comprising a body having spaced ribs with notched edges to receive tie rods, and perforated plates connected to the ribs on said staves to provide air shafts extending the length of the wall.

3. A wall composed of a plurality of adjoining rows of cement staves, each row of staves laid in courses one above the other, the staves of alternate rows only having spaced ribs with notched edges to receive tie rods for binding the wall, and perforated plates connected to the ribs on said staves to provide air shafts extending the length of the wall.

4. A wall composed of a plurality of adjoining rows of cement staves, each row of staves laid in courses one above the other, the staves of alternate rows only provided with vertical vents which adjoined produce air shafts throughout the length of such rows.

5. A wall composed of a plurality of adjoining rows of cement staves, each row of staves laid in courses one above the other, the staves of alternate rows having channeled faces to provide air shafts throughout the length of such rows, and metallic coverings for such staves to enclose said air shafts, said coverings provided with ventilating openings in communication with said air shafts.

6. A cement stave for building purposes, comprising a cement body formed with a channeled face, and a removable metallic plate enclosing said channeled face to provide an air shaft throughout the length of said stave.

7. A cement stave for building purposes, comprising a cement body formed with a channeled face, and a removable metallic plate enclosing said channeled face to provide an air shaft throughout the length of said stave, said plate formed with vent openings in communication with said air shaft and protected by lips stamped out of the body of said plate.

In witness whereof, I have hereunto affixed my hand this 19th day of June, 1922.

MARK R. DEYO.